(12) United States Patent
Mohamed et al.

(10) Patent No.: US 9,523,436 B2
(45) Date of Patent: Dec. 20, 2016

(54) VALVE ASSEMBLY AND SYSTEM

(75) Inventors: Zahroof Mohamed, Cypress, TX (US); Darren D. Matheny, Houston, TX (US)

(73) Assignee: Zahroof Valves, Inc., Houston, TX (US)

( * ) Notice: Subject to any disclaimer, the term of this patent is extended or adjusted under 35 U.S.C. 154(b) by 904 days.

(21) Appl. No.: 12/525,302

(22) PCT Filed: Feb. 6, 2008

(86) PCT No.: PCT/US2008/053237
§ 371 (c)(1),
(2), (4) Date: Jul. 30, 2009

(87) PCT Pub. No.: WO2008/100758
PCT Pub. Date: Aug. 21, 2008

(65) Prior Publication Data
US 2010/0008805 A1    Jan. 14, 2010

Related U.S. Application Data

(60) Provisional application No. 60/900,891, filed on Feb. 12, 2007.

(51) Int. Cl.
F04B 39/10    (2006.01)
F16K 15/06    (2006.01)
F16K 31/08    (2006.01)

(52) U.S. Cl.
CPC ......... F16K 15/066 (2013.01); F04B 39/1013 (2013.01); F16K 31/084 (2013.01)

(58) Field of Classification Search
CPC ..... F04B 39/10; F04B 39/1013; F16K 15/028; F16K 15/06; F16K 15/063; F16K 15/066; F16K 31/084

(Continued)

(56) References Cited

U.S. PATENT DOCUMENTS 1,784,640 A * 12/1930 Noble ............... F01L 3/02
                                            123/188.1
2,160,401 A *  5/1939 Engelman .............. 417/559

(Continued)

FOREIGN PATENT DOCUMENTS

AU    6306169    4/1971
DE    19930969   4/2000

(Continued)

OTHER PUBLICATIONS

Joe Kane, "Unique Poppet Valve Developed for Piston Compressors," CompressorTech, Diesel & Gas Turbine Publications, May-Jun. 1997.

(Continued)

*Primary Examiner* — Charles Freay
*Assistant Examiner* — Philip Stimpert
(74) *Attorney, Agent, or Firm* — Iselin Law PLLC; Louis H. Iselin

(57) ABSTRACT

A novel valve assembly is provided. In one embodiment, the valve assembly includes a seat plate that includes a fluid conduit and an impact bushing that is coupled to the seat plate at a position adjacent to the fluid conduit. The valve assembly also includes a sealing assembly that is configured to form a seal with the impact bushing and to control flow of a fluid through the fluid conduit via relative displacement of the sealing assembly from the impact bushing. Systems and methods related to such a valve assembly are also disclosed. Data supplied from the esp@cenet database-Worldwide.

16 Claims, 6 Drawing Sheets

(58) Field of Classification Search
USPC .................. 251/332, 318, 321, 324; 417/559
See application file for complete search history.

(56) References Cited

U.S. PATENT DOCUMENTS

| | | | |
|---|---|---|---|
| 2,367,260 A | | 1/1945 | Hubert |
| 2,599,898 A | | 6/1952 | Dalrymple |
| 2,667,895 A | * | 2/1954 | Pool et al. .................... 137/528 |
| 2,888,037 A | | 5/1959 | Jones et al. |
| 2,969,951 A | * | 1/1961 | Walton ......................... 251/332 |
| 3,189,675 A | | 6/1965 | Moore et al. |
| 3,212,751 A | | 10/1965 | Hassa |
| 3,409,038 A | | 11/1968 | Blackford |
| 3,485,441 A | | 12/1969 | Eaton |
| 3,495,620 A | | 2/1970 | Bezell |
| 4,273,153 A | | 6/1981 | Brown |
| 4,512,934 A | | 4/1985 | Bucher |
| 4,750,705 A | | 6/1988 | Zippe |
| 5,025,828 A | | 6/1991 | Lin |
| 5,088,521 A | * | 2/1992 | Johnson .................. E21B 21/01 137/516.29 |
| 5,320,136 A | * | 6/1994 | Morris .................. F16K 15/021 137/516.29 |
| 5,961,550 A | | 10/1999 | Carpentier et al. |
| 6,000,417 A | | 12/1999 | Jacobs |
| 6,443,182 B1 | * | 9/2002 | Hathcock .............. F16K 15/063 137/514.5 |
| 6,581,632 B2 | * | 6/2003 | Walpole et al. ........... 137/512.1 |
| 6,591,864 B1 | | 7/2003 | Denby |
| 6,619,321 B2 | | 9/2003 | Reid et al. |

FOREIGN PATENT DOCUMENTS

| | | |
|---|---|---|
| EP | 0457066 | 11/1991 |
| EP | 0700668 | 3/1996 |
| EP | 1245881 | 10/2002 |
| EP | 1555471 | 7/2005 |
| GB | 190904400 | 2/1910 |
| GB | 2416822 | 8/2006 |
| WO | WO2005114835 | 12/2005 |
| WO | WO2006045300 | 5/2006 |
| WO | WO2006088731 | 8/2006 |
| WO | WO2008127763 | 10/2008 |
| WO | WO2008127764 | 10/2008 |
| WO | WO2009023405 | 2/2009 |

OTHER PUBLICATIONS

PCT Application No. PCT/US09/45864 of Cameron International Corporation filed Jun. 1, 2009 entitled "Systems and Devices Including Valves Coupled to Electric Devices and Methods of Making, Using, and Operating the Same.".

* cited by examiner

VALVE ASSEMBLY AND SYSTEM

CROSS REFERENCE TO RELATED APPLICATIONS

This application claims priority to PCT Application No. PCT/US2008/053237 entitled "Valve Assembly and System", filed on Feb. 6, 2008, which is herein incorporated by reference in its entirety, and which claims priority to U.S. Provisional Patent Application No. 60/900,891, entitled "Valve Assembly and System", filed on Feb. 12, 2007, which is herein incorporated by reference in its entirety.

FIELD OF THE INVENTION

The present invention relates generally to flow control systems. More particularly, the present invention relates to a novel valve assembly for use with various flow control systems, including compression systems.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As will be appreciated, fluids, such as natural gas and air, have a wide array of uses in industrial and commercial applications. For instance, natural gas may be used to provide power to a range of vehicles, to heat homes during winter, and to operate various consumer appliances, such as ovens or clothes dryers. Further, natural gas may be used to generate electricity for distribution over a power grid, and may be used in the manufacture of an array of products and materials, including glass, steel, and plastics, for example.

In order to meet the demand for natural gas, companies may spend a significant amount of time and resources searching for, extracting, and transporting natural gas. It will be appreciated that natural gas may be produced from oil fields, in which case the gas may be referred to as casinghead gas, or from natural gas fields. As may also be appreciated, transportation of such natural gas, such as through a pipeline from the production site to a consumer, is often facilitated by compression of the gas via a compressor.

One common type of compressor for such applications is the reciprocating compressor. Such reciprocating compressors are positive-displacement devices that generally utilize a crankshaft that is coupled to pistons, via connecting rods and crossheads, to reciprocally drive the pistons and compress a fluid within attached compression cylinders. As may be appreciated by one skilled in the art, natural gas (or some other fluid) is generally introduced into compression chambers of the cylinders through one or more inlet or suction valve assemblies and, following compression, the fluid generally exits the cylinders via one or more outlet or discharge valve assemblies.

Many compressors routinely operate at hundreds of rotations per minute (rpm), and some compressors are designed for operation at even higher levels, such as over one thousand rpm. This operating speed results in the opening and closing of sealing elements within the valve assemblies at a similarly high frequency of hundreds or thousands of times per minute. Due to the rapid cycling of the sealing elements, various components of typical valve assemblies, such as the seat and guard plates and the sealing elements themselves, may experience extensive wear, which may result in failure of the valve assembly and even the compressor in which it is installed. To avoid such failure, a typical, worn valve assembly may need to be refurbished, such as through replacement of the sealing elements and machining of the seat and/or guard plates, or replaced entirely. Of course, such refurbishment or replacement may often be time-consuming and/or costly, and generally results in downtime for a system in which the worn valve assembly was disposed. Consequently, there is a need for a valve assembly that exhibits an increased durability and life expectancy, and that allows for easier, faster, and cheaper maintenance.

SUMMARY

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

Embodiments of the present invention generally relate to a novel valve assembly. In some exemplary embodiments, the valve assembly is a poppet valve assembly. The valve assemblies of other embodiments, however, may have different configurations, such as plate valve or ring valve assemblies. An exemplary valve assembly of one embodiment includes an impact bushing disposed between a sealing assembly and a seat plate. In another embodiment, the valve assembly includes an impact bushing disposed between a sealing assembly and a guard plate. Other embodiments may include a sealing assembly generally disposed between a seat plate and a guard plate, as well as impact bushings disposed between the respective plates and the sealing assembly. In some embodiments, such as those in which a sealing element of the sealing assembly is metal and the impact bushings are plastic, the impact bushings are configured as the wear members of the valve assembly to reduce wear on the other components, thus reducing or eliminating the need to machine, or otherwise repair, refurbish, or replace the seat plate, the guard plate, or the sealing assembly. The impact bushings of such embodiments may be easily replaceable to facilitate easier maintenance and servicing of the valve assembly.

Various refinements of the features noted above may exist in relation to various aspects of the present invention. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of the present invention without limitation to the claimed subject matter.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF SPECIFIC EMBODIMENTS

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Figure 1:
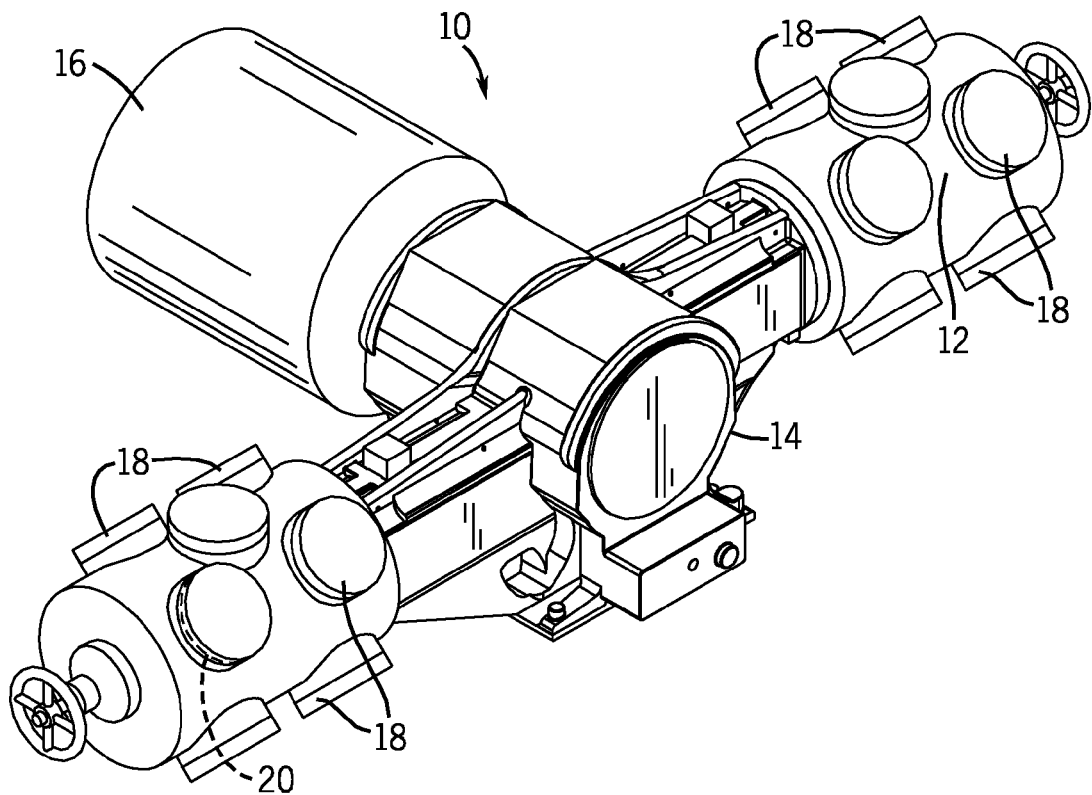
FIG. 1 is a perspective view of a reciprocating compressor including an exemplary valve assembly in accordance with one embodiment of the present invention.

Turning now to the figures, an exemplary compressor 10 is provided in FIG. 1. In the presently illustrated embodiment, the compressor 10 includes a pair of compression cylinders 12 coupled to a frame 14. As discussed in greater detail below, a variety of internal components may be disposed within the cylinders 12 and the frame 14 to enable compression of fluids within the cylinders 12. In one embodiment, the compressor 10 may be utilized to compress natural gas. However, in other embodiments, the compressor 10 may be configured and/or utilized to compress other fluids. A mechanical power source or driver 16, such as an engine or an electric motor, may be coupled to the compressor 10 to provide mechanical power to the various internal components and to enable compression of the fluid within the cylinders 12. To facilitate access to such internal components, as may be desired for diagnostic or maintenance purposes, openings in the frame 14 may be provided and selectively accessed via removable covers disposed over the openings.

Further, the exemplary cylinders 12 include capped recesses 18 configured to receive valve assemblies, such as valve assembly 20. While only a single valve assembly 20 is illustrated, it will be appreciated that, in various embodiments, additional valve assemblies are included within some or all of the other capped recesses 18. It will also be appreciated that the cylinders 12 may include internal fluid conduits between the recesses 18 and the valve assemblies 20 to facilitate flow of a fluid into and out of the cylinders 12 through such valve assemblies. Additionally, various installation components, such as cages or fasteners, may be employed to facilitate mounting of the valve assemblies 20 within the recesses 18.

Although the exemplary compressor 10 is illustrated as a two-throw reciprocating compressor, other compressor configurations may also employ and benefit from the presently disclosed techniques. For instance, in other embodiments, the compressor 10 may include a different number of cylinder throws, such as a four-throw compressor, a six-throw compressor, a couple-free reciprocating compressor, a screw compressor, or the like. Further, other variations are also envisaged, including variations in the length of stroke, the operating speed, and the size, to name but a few.

Figure 2:
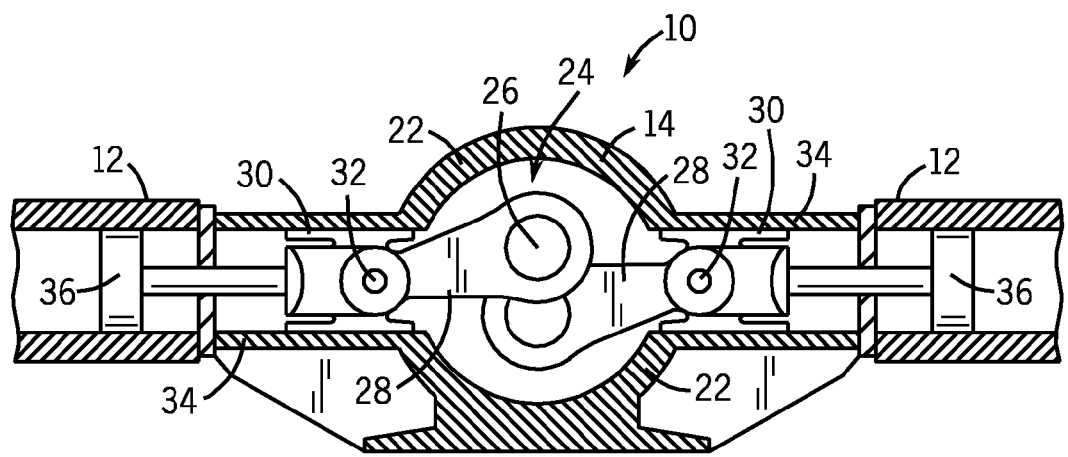
FIG. 2 is an axial cross-sectional view of the exemplary compressor of FIG. 1, illustrating internal components of the compressor in accordance with one embodiment of the present invention.

A cross-sectional view of the exemplary compressor 10 is provided in FIG. 2, which illustrates a number of exemplary internal components of the compressor of FIG. 1. In the presently illustrated embodiment, the frame 14 of the exemplary compressor 10 includes a hollow central body or housing 22 that generally defines an interior volume 24 in which various internal components may be received, such as a crankshaft 26. In one embodiment, the central body 22 may have a generally curved or cylindrical shape. It should be noted, however, that the central body 22 may have other shapes or configurations in full accordance with the present techniques.

In operation, the driver 16 rotates the crankshaft 26 supported within the interior volume 24 of the frame 14. In one embodiment, the crankshaft 26 is coupled to crossheads 30 via connecting rods 28 and pins 32. The crossheads 30 are disposed within crosshead guides 34, which generally extend from the central body 22 and facilitate connection of the cylinders 12 to the compressor 10. In one embodiment, the compressor 10 includes two crosshead guides 34 that extend generally perpendicularly from opposite sides of the central body or housing 22, although other configurations are also envisaged. As may be appreciated, the rotational motion of the crankshaft 26 is translated via the connecting rods 28 to reciprocal linear motion of the crossheads 30 within the crosshead guides 34.

As noted above, the cylinders 12 are configured to receive a fluid for compression. The crossheads 32 are coupled to pistons 36 disposed within the cylinders 12, and the reciprocating motion of the crossheads allows compression of fluid within the cylinders 12 via the pistons 36. Particularly, as a piston 36 is driven forward (i.e., outwardly from central body 22) into a cylinder 12, the piston 36 forces fluid within the cylinder into a smaller volume, thereby increasing the pressure of the fluid. A discharge valve, such as valve assembly 20, may then open to allow the pressurized or compressed fluid to exit the cylinder 12. The piston 36 may then stroke backward, and additional fluid may enter the cylinder 12 through an inlet valve, which may also comprise a valve assembly 20, for compression in the same manner described above. Further, as will be appreciated, the cylinders 12 can be configured to facilitate fluid compression on both the forward and the backward strokes of the piston 36. For instance, as the piston 36 moves forward in the manner discussed above to compress fluid on one side of the piston, additional fluid may be introduced into the cylinder on the opposite side of the piston. Such fluid would then be compressed on the backward stroke of the piston 36.

Exemplary valve assemblies 20 in accordance with certain embodiments of the present invention are depicted in FIGS. 3-9. In the embodiments illustrated in FIGS. 3-9, the exemplary valve assemblies 20 are poppet valve assemblies. As noted above, however, valve assemblies 20 of other embodiments may have a different configuration, including that of plate, ring, channel, and/or strip valve assemblies. Further, although discussed above in the context of a compressor cylinder, it should be noted that exemplary valve assemblies 20 can be employed in other structures or arrangements. For instance, in other embodiments, a valve assembly 20 may operate as a scavenger valve for an engine, or as a check valve in a pipeline, hydraulic line, or refrigeration circuit, to name but a few examples.

Figure 3:
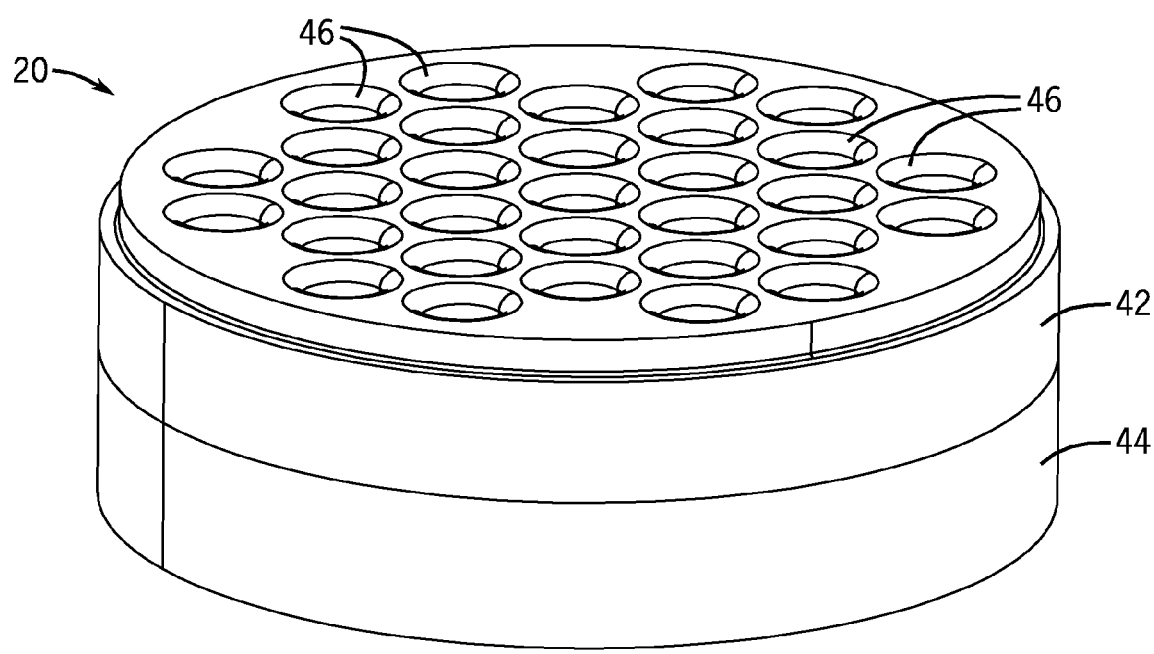
FIG. 3 is a perspective view of an exemplary poppet valve assembly in accordance with one embodiment of the present invention.
Figure 4:
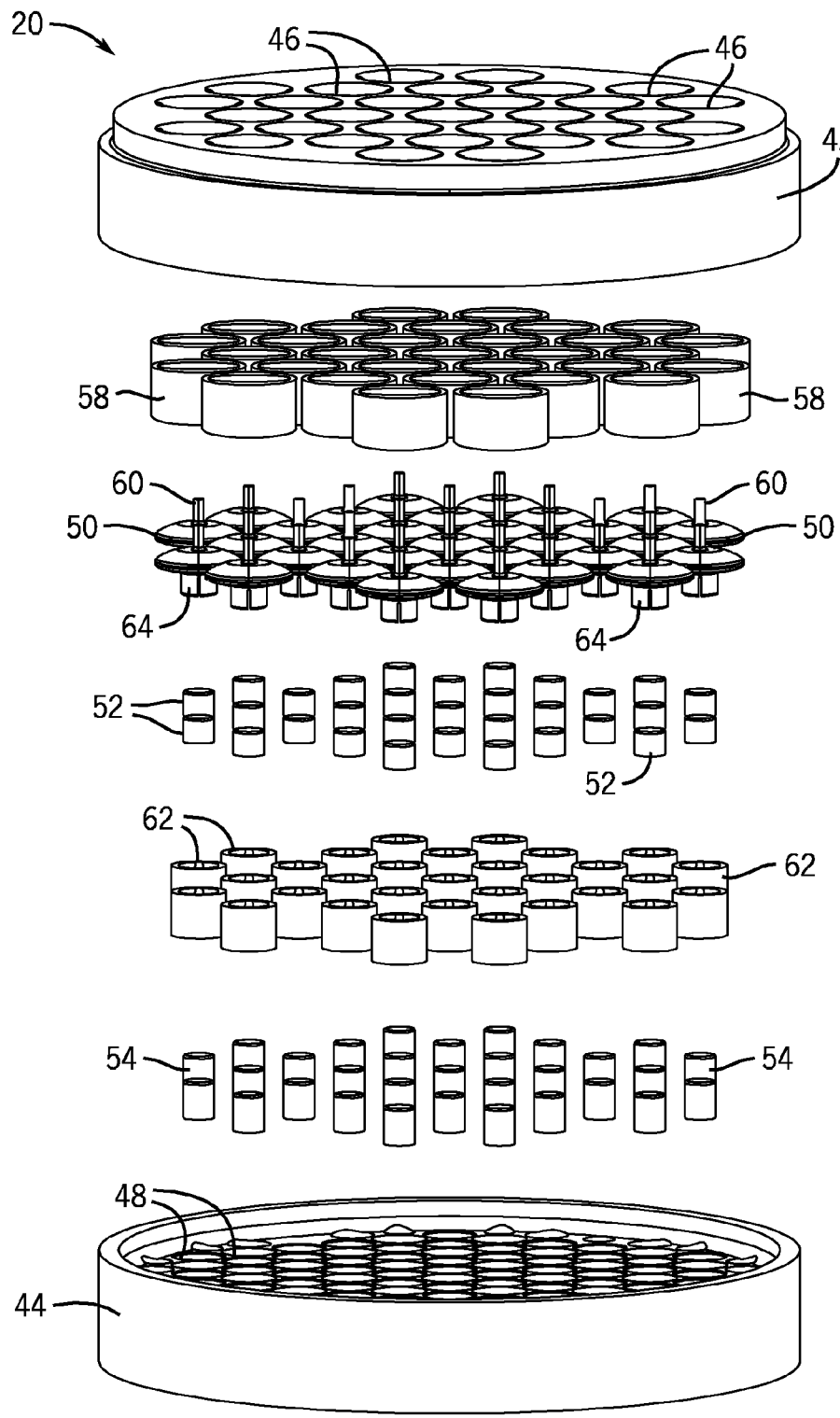
FIG. 4 is an exploded view of the poppet valve assembly of FIG. 3, illustrating certain components of the valve assembly in accordance with one embodiment of the present invention.
Figure 5:
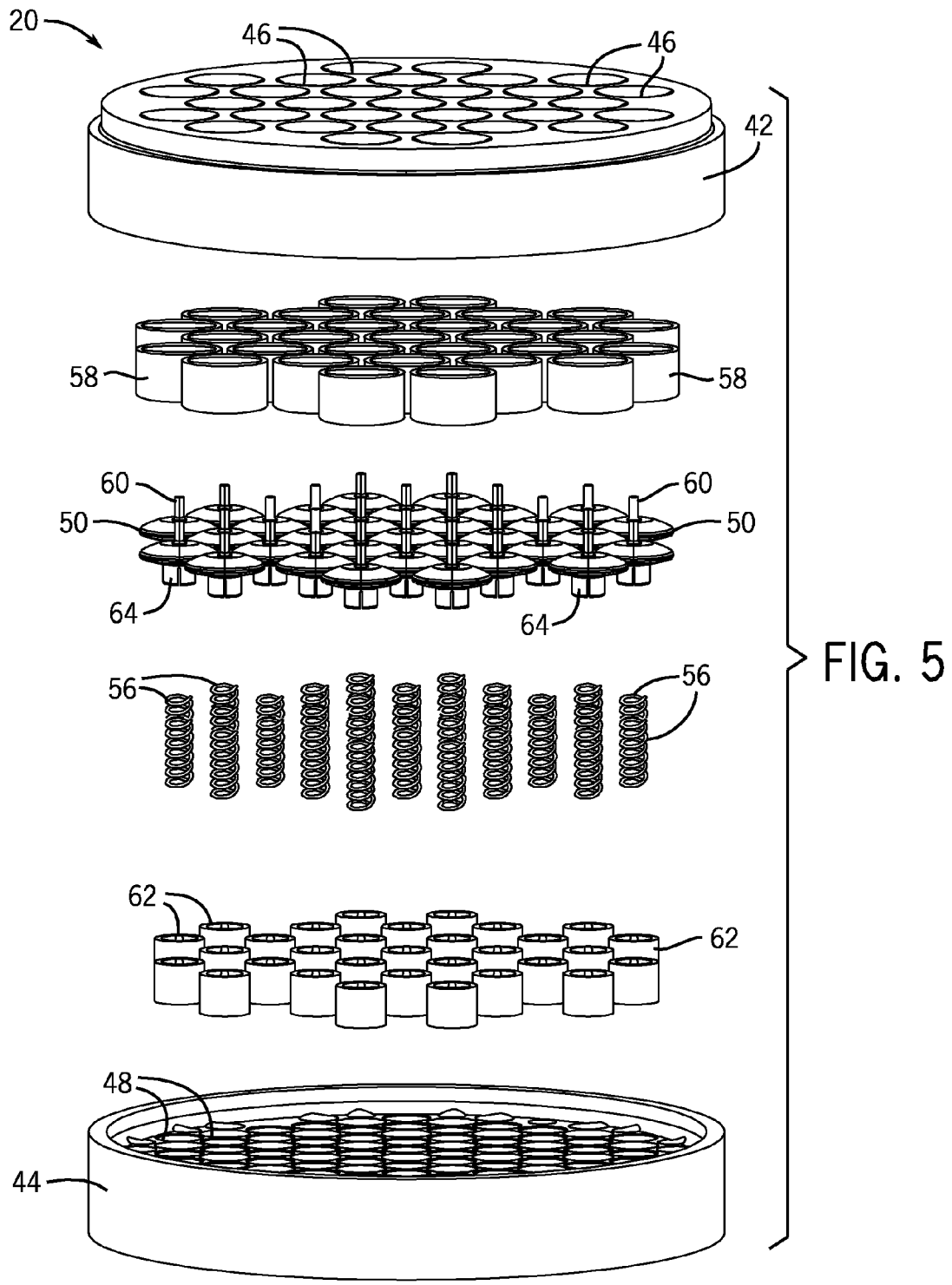
FIG. 5 is an exploded view of another exemplary poppet valve assembly in accordance with one embodiment of the present invention.

As shown in FIGS. 3 and 4, the exemplary valve assembly 20 includes seat and guard structures or members, such as a seat plate 42 and a guard plate 44, respectively. The seat and guard plates 42 and 44 may be coupled to one another via one or more screws, or in some other suitable fashion. The seat plate 42 and the guard plate 44 are made from a high-strength material, such as metal, and include fluid conduits or ports 46 and 48, respectively, which allow a fluid (such as natural gas) to pass through the valve assembly 20.

Further, the exemplary valve assembly 20 includes one or more sealing assemblies disposed between the seat plate 42 and the guard plate 44 that generally control the passage of a fluid through the fluid passageways or ports 46 and 48. In the presently illustrated embodiment, the sealing assemblies include a plurality of poppets 50, and biasing elements, such as magnets 52 and 54 (FIG. 4) or springs 56 (FIG. 5), that are generally configured and/or oriented to apply a force on the poppets 50 toward the seat plate 42. It should be noted that, in other embodiments, the valve assembly 20 could include other sealing elements instead of the poppets 50, such as a plate or a set of rings, such as in a plate valve assembly or a ring valve assembly, respectively. Further, in still other embodiments, the seat plate 42 and/or the guard plate 44 may be omitted from the valve assembly 20 in favor of some other seat and/or guard structures, including pipe fittings, flanges, shoulders, recesses, or the like configured to receive a sealing assembly, such as in the case of a single-poppet check valve, for instance.

During operation, the poppets 50 (or other sealing elements) typically open and close with respect to the seat plate 42 in response to a pressure differential between the fluid ports 46 and 48. The exemplary poppets 50 are formed from a material capable of withstanding high operating speeds, temperatures, impact forces, and differential pressures. For example, in various embodiments, the poppets 50 are formed from a material such as an aluminum and/or magnesium alloy, some other metal, a plastic, a ceramic, or the like. Further, in some embodiments, the particular material from which the poppets 50 are formed may be chosen to provide a high strength-to-weight ratio at the intended operating temperature of the valve assembly 20. The material of poppet 50 may also be chosen to have a strength and/or a stiffness greater than that of the materials of either or both of the impact bushings 58 and 62 discussed immediately below. It should also be noted that while certain embodiments of the valve assembly 20 may comprise the seat plate 42, the guard plate 44, the members of the sealing assemblies discussed above, and the impact bushings 58 and 62, other embodiments in accordance with the present techniques may consist of, or consist essentially of, these same elements or some sub-combination thereof.

As may be appreciated, in various embodiments, the poppets 50 may open and close with respect to the seat plate 42 hundreds, or even thousands, of times per minute during operation of the valve assembly 20. In one embodiment, the valve assembly 20 includes impact bushings 58 and impact bushings 62, which are disposed in the seat plate 42 and the guard plate 44, respectively, and are positioned to absorb the impact of the poppets 50 while closing and opening. The impact bushings 58 and 62 may be formed from the same material, or from different materials. In some embodiments, the one or more materials from which the impact bushings are formed are selected based on their impact absorption properties. In one embodiment, the impact bushings 58 and 62 are made of plastic, and may be formed through an injection molding process or by some other suitable manufacturing process. As will be appreciated, however, these impact bushings 58 and 62 may be formed from suitable materials other than plastic.

In some embodiments, the impact bushings 58 and 62 are configured to be the primary wear members of the valve assembly 20, and to reduce the amount of wear on the seat plate 42, the guard plate 44, and the poppets 50 that would otherwise occur in the absence of such bushings. Further, worn impact bushings 58 and 62 can be easily and individually replaced, which facilitates refurbishment of the valve assembly 20 without requiring replacement of the poppets 50, machining of the seat or guard plates 42 or 44, or the like. Still further, in some embodiments the impact bushings 58 are configured as linear bearings to receive guide members 60 protruding from upper surfaces of the poppets 50, while the impact bushings 62 are configured to receive stems 64 of the poppets 50.

Figure 6:
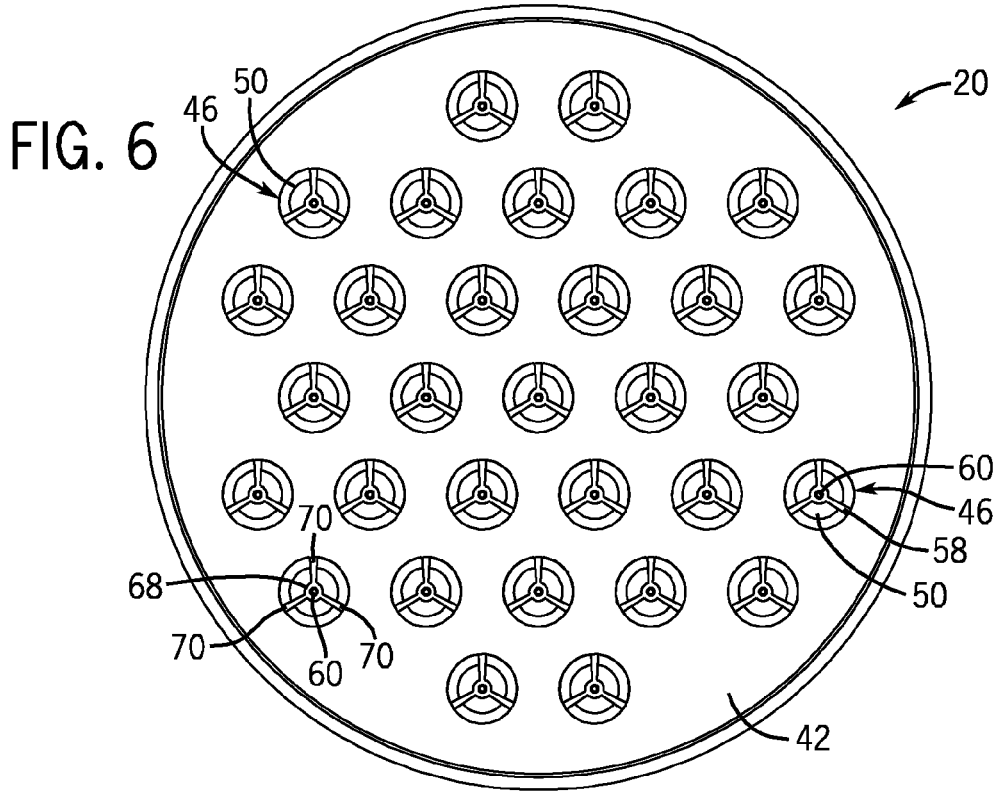
FIG. 6 is top plan view of the poppet valve assembly of FIG. 3 in accordance with one embodiment of the present invention.
Figure 7:
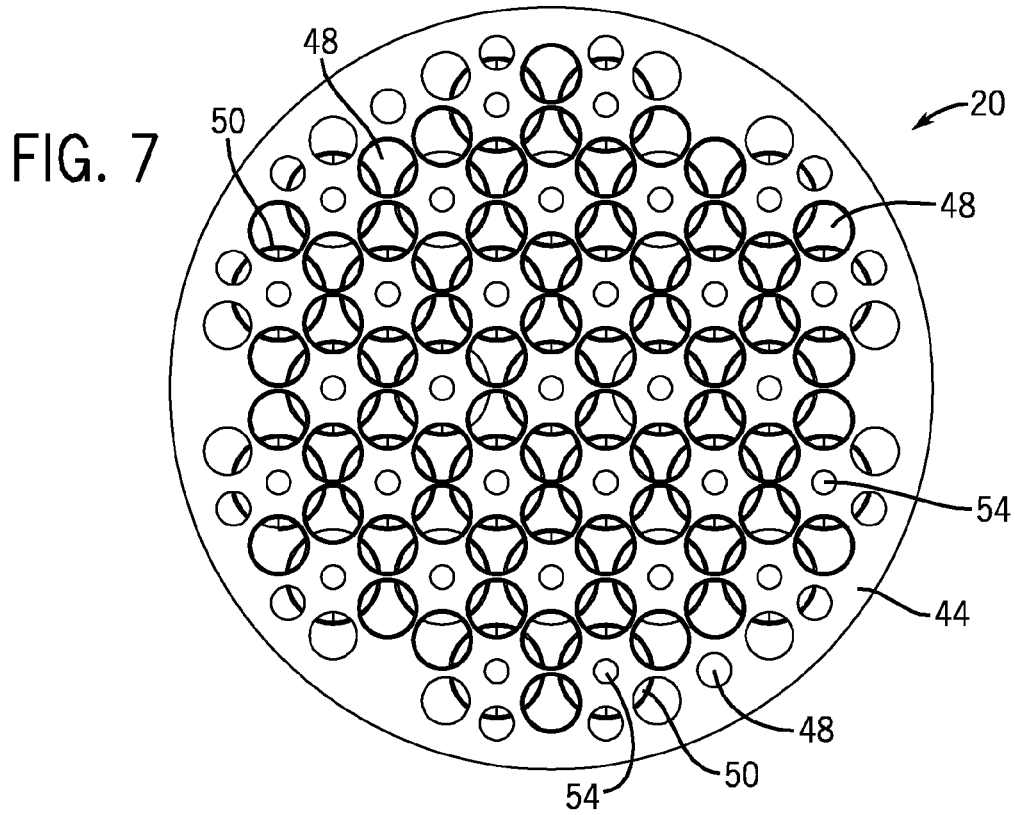
FIG. 7 is a bottom plan view of the poppet valve assembly of FIG. 3 in accordance with one embodiment of the present invention.

By way of further illustration, top and bottom plan views of the exemplary poppet valve assembly 20 of FIG. 3 are provided in FIGS. 6 and 7. In this embodiment, each of the impact bushings 58 includes a central guide or alignment feature 68, which cooperates with the guide member 60 of a poppet 50 to maintain alignment of the poppet during operation of the valve assembly. While the impact bushings 58 of the present illustration include three support arms 70, which support the alignment features 68 within the interior of the impact bushings 58, it should be noted that a different number of such support arms could be employed in other embodiments in full accordance with the present techniques.

Figure 8:
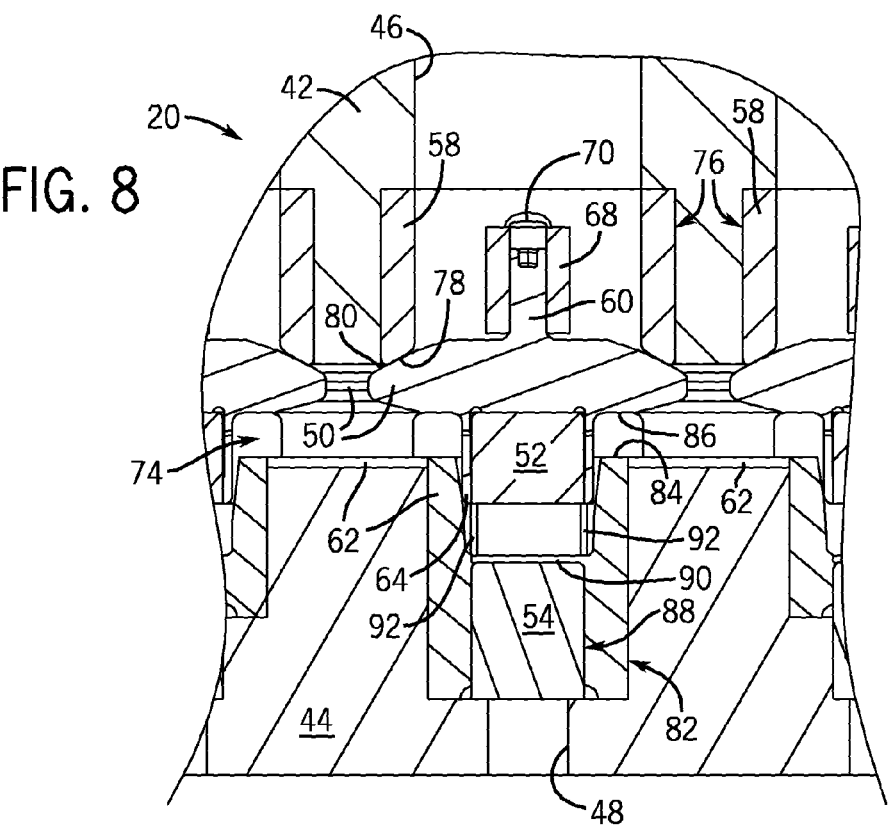
FIG. 8 is a partial cross-sectional view of the poppet valve assembly of FIG. 3, illustrating an interior seal member disposed in a closed position.
Figure 9:
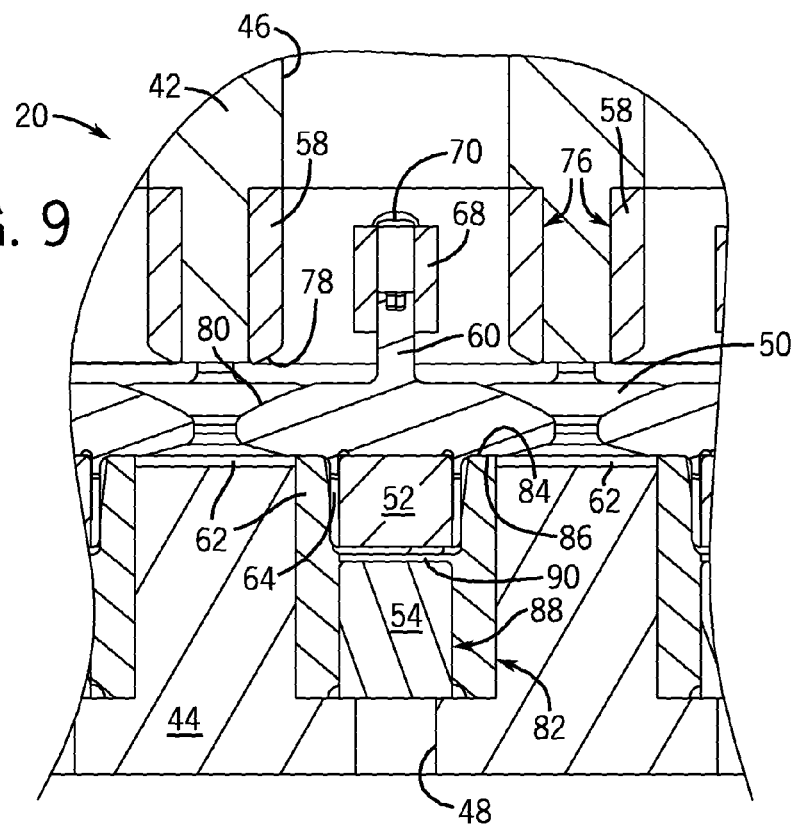
FIG. 9 is a partial cross-sectional view of the poppet valve assembly of FIG. 3, illustrating an interior seal member disposed in an open position.

Certain additional features of the exemplary valve 20 may be better understood with reference to the cross-sectional views of FIGS. 8 and 9. In FIG. 8, the poppet 50 is disposed in a region 74 between the seat and guard plates 42 and 44, and is in a closed orientation that prevents fluid communication between the fluid ports 46 and 48. Conversely, in FIG. 9, the poppet 50 is illustrated in an open position, which allows fluid to flow through the valve assembly 20 via the fluid conduits or ports 46 and 48. In the present embodiment, the seat plate 42 includes a plurality of recesses 76 that are disposed adjacent the fluid ports 46 and are configured to receive the impact bushings 58 proximate (i.e., near and/or directly adjoining) the fluid ports 46. In certain embodiments, one or more of the impact bushings 58 includes a lower surface 78 that is formed as a complementary surface to an upper surface 80 of the poppet 50. In such embodiments, the matching of the surfaces facilitates the formation of the seal between the poppet 50 and the impact bushing 58. Further, the inclusion of a complementary impact bushing 58 enables the formation of a seal without requiring special machining of the seat plate 42 to geometrically match the surface 80 of the poppet 50. Additionally, while the surfaces 78 and 80 are beveled in the presently illustrated embodiment, other mating configurations are also envisaged.

In the present embodiment, the impact bushings 62 are similarly disposed in recesses 82 formed in the guard plate 44. Each of the impact bushings 62 includes an upper surface 84 that is configured to abut a lower surface 86 of a poppet 50 when the poppet is in a fully-opened position. The impact bushings 62 are generally configured to receive stems 64 of the poppets 50 as the poppets move into the open position. In one magnetically-biased embodiment, an impact bushing 62 includes a recess 88 and a mounting wall 90 for receiving the magnet 54, and the location of guide member 60 on the upper surface of the poppet 50 allows the magnet 52 to be press fit (instead of molded) into the poppet, thus allowing separate replacement of these components. Further, in some embodiments, the impact bushing 62 may include one or more passages 92 that allow fluid to flow from the region 74 to a fluid port 48 through the impact bushing 62.

It should be noted that, in certain embodiments, the recesses 76 and 82 are sized with respect to the impact bushings 58 and 62 such that, once installed, portions of the impact bushings project outwardly from the seat and guard plates 42 and 44, respectively, and into the region 74. In such embodiments that also include a metallic seal member and metallic seat and guard plates, as the impact bushings 58 and/or 62 become sufficiently worn, the seal member will begin to impact the respective metal seal plate 42 and/or metal guard plate 44. Such contact will be accompanied by an appreciable increase in the operating volume of the valve assembly, indicating that the valve assembly 20, or certain components thereof, should be repaired, refurbished, or replaced. As a result, this indication or warning signal may prevent or reduce the incidence of valve assembly failure and unexpected shutdown of a compressor system. It should also be noted that, in some embodiments, the inclusion of the impact bushings 58 and 62 may reduce or eliminate the need for certain processing steps and expenses in the manufacture of the seat plate 42 and/or guard plate 44, such as the machining of sealing surfaces in the seat plate 42 to match the contours of the poppets 50 or other sealing element, or the machining of the guard plate 44 to provide a high surface finish on the surfaces which would otherwise contact the moving sealing element.

Consequently, certain embodiments of the present techniques may provide a lower cost valve assembly that may be more simply manufactured.

During operation of the presently illustrated embodiment, the magnet 54 applies a force to the magnet 52, which is secured to the poppet 50. This interaction results in a biasing force on the poppet 50 toward the closed position, such as that illustrated in FIG. 8. When the pressure within a fluid port 46 above the poppet 50 is greater than the pressure within a fluid port 48 below the poppet 50, the pressure differential applies a second force to the poppet 50, which is directed opposite the force imparted by the magnets 52 and 54. Further, once this pressure differential reaches a certain threshold, the downward force exerted on the poppet 50 by this pressure differential will exceed the force applied to the poppet by the magnets 52 and 54 (and any frictional forces), and the poppet 50 will move toward the open position illustrated in FIG. 9, allowing fluid communication between the fluid ports 46 and 48 via the region 74. Once the pressure differential falls back below the threshold, the poppet 50 will return to the closed position described above.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A valve assembly, comprising:
a seat plate having a first fluid conduit;
a guard plate having a second fluid conduit;
a first impact bushing formed of plastic having an outer wall, a central guide, and one or more arms supporting the central guide, wherein the first impact bushing is coupled to the seat plate proximate the fluid conduit, and the central guide is configured as a linear bearing;
a sealing assembly configured to form a seal with the first impact bushing and to control fluid flow through the first fluid conduit via relative displacement of the sealing assembly from the first impact bushing, the sealing assembly comprising:
a poppet having a guide member protruding from a first surface of the poppet; and
a biasing member configured to bias the poppet;
wherein the central guide cooperates with the guide member to maintain alignment of the poppet during operation of the valve assembly, and wherein a distal axial end of the guide member of the poppet is disposed inside the central guide of the first impact bushing between opposite axial ends of the outer wall in both an open position and a closed position of the poppet;
wherein the guard plate is coupled to the seat plate such that the sealing assembly is disposed between the guard plate and the seat plate, and the guard plate includes a shoulder arranged within the second fluid conduit; and
a second impact bushing formed of plastic is coupled to the guard plate in contact with the shoulder, wherein the second impact bushing is configured to contact a second surface of the poppet opposite the first surface of the poppet during operation of the valve assembly.

2. The valve assembly of claim 1, wherein the first impact bushing is an injected molded plastic structure having the outer wall, the central guide, and the one or more arms supporting the central guide.

3. The valve assembly of claim 1, wherein the poppet comprises a stem disposed inside the second impact bushing.

4. The valve assembly of claim 3, wherein a distal axial end of the stem of the poppet is disposed inside the second impact bushing between opposite axial ends of the second impact bushing in both the open position and the closed position of the poppet.

5. The valve assembly of claim 1, wherein the poppet is formed of a magnesium material.

6. The valve assembly of claim 1, wherein the poppet comprises a beveled surface, and a proximal axial end of the impact bushing comprises a complementary mating surface configured to engage the beveled surface.

7. The valve assembly of claim 1, wherein the biasing member comprises at least one magnet.

8. The valve assembly of claim 7, wherein the at least one magnet comprises a first magnet disposed in the poppet and a second magnet external to the poppet.

9. The valve assembly of claim 7, wherein the at least one magnet comprises a first magnet press-fit into the poppet.

10. The valve assembly of claim 1, wherein the first impact bushing is disposed in a recess formed in the seat plate about the fluid conduit, and the first impact bushing projects outwardly from the seat plate.

11. The valve assembly of claim 1, wherein the one or more arms of the impact bushing comprise first, second, and third arms.

12. The valve assembly of claim 1, wherein the central guide is disposed completely inside the outer wall of the impact bushing between the opposite axial ends of the outer wall.

13. A valve assembly, comprising:
a first impact bushing formed of plastic having an outer wall, a central guide, and one or more arms supporting the central guide, wherein the first impact bushing is configured to be coupled to a seat member, and the central guide is configured as a linear bearing;
a poppet having a guide member protruding from a first side of the poppet, wherein the poppet is configured to form a seal with the first impact bushing, wherein the first impact bushing and the poppet are configured to control flow of a fluid through a first fluid passage via relative displacement of the poppet from the first impact bushing; and
a guard plate having a second fluid conduit;
wherein the central guide cooperates with the guide member to maintain alignment of the poppet during axial movement of the poppet between an open position and a closed position, and wherein the central guide is disposed completely inside the outer wall of the first impact bushing between opposite axial ends of the outer wall, wherein a distal axial end of the guide member of the poppet is disposed inside the central guide of the first impact bushing between opposite axial ends of the first impact bushing in both the open position and the closed position of the poppet, wherein the guard plate is coupled to the seat member such that the sealing assembly is disposed between the guard plate and the seat member, and the guard plate includes a shoulder arranged within the second fluid conduit; and
a second impact bushing formed of plastic is coupled to the guard plate in contact with the shoulder, wherein the second impact bushing is configured to contact a second surface of the poppet opposite the first surface of the poppet during operation of the valve assembly.

14. The valve assembly of claim 13, wherein the first impact bushing is an injected molded plastic structure having the outer wall, the central guide, and the one or more arms supporting the central guide, wherein the one or more arms comprise a plurality of arms.

15. A compressor, comprising:
a frame;
a compression cylinder coupled to the frame;
a plurality of mechanical components disposed in the frame and configured to facilitate compression of a first fluid within the compression cylinder; and
at least one valve assembly disposed in the compression cylinder, the at least one valve assembly comprising:
a first impact bushing formed of plastic having an outer wall, a central guide, and one or more arms supporting the central guide, wherein the first impact bushing is configured to be coupled to a seat member, and the central guide is configured as a linear bearing;
a poppet having a guide member protruding from the poppet, wherein the poppet is configured to form a seal with the first impact bushing, wherein the first impact bushing and the poppet are configured to control flow of the first fluid through a first fluid passage via relative displacement of the poppet from the impact bushing; and
a guard plate having a second fluid passage;
wherein the central guide cooperates with the guide member to maintain alignment of the poppet during operation of the valve assembly, wherein the central guide is disposed completely inside the outer wall of the first impact bushing between opposite axial ends of the outer wall, wherein a distal axial end of the guide member of the poppet is disposed inside the central guide of the first impact bushing between opposite axial ends of the first impact bushing in both an open position and a closed position of the poppet, wherein the guard plate is coupled to the seat member such that the sealing assembly is disposed between the guard plate and the seat member, and the guard plate includes a shoulder arranged within the second fluid conduit; and
a second impact bushing formed of plastic is coupled to the guard plate in contact with the shoulder, wherein the second impact bushing is configured to contact a second surface of the poppet opposite the first surface of the poppet during operation of the valve assembly.

16. The compressor of claim 15, wherein the first impact bushing has a first axial end proximate and configured to impact a first side of the poppet, wherein the second impact bushing has a second axial end proximate and configured to impact a second side of the poppet opposite from the first side of the poppet.

* * * * *